(12) United States Patent
Burger

(10) Patent No.: US 6,604,373 B1
(45) Date of Patent: Aug. 12, 2003

(54) AIR CONDITIONING SYSTEM

(76) Inventor: Richard A. Burger, 29820 450th St., Moravia, IA (US) 52571

( * ) Notice: Subject to any disclaimer, the term of this patent is extended or adjusted under 35 U.S.C. 154(b) by 0 days.

(21) Appl. No.: 10/120,568

(22) Filed: Apr. 11, 2002

(51) Int. Cl.$^7$ ............................................... F25D 15/00
(52) U.S. Cl. ......................... 62/237; 62/260; 62/238.6; 62/324.1
(58) Field of Search .............. 62/260, 238.6, 62/324.1, 237

(56) References Cited

U.S. PATENT DOCUMENTS

| | | | |
|---|---|---|---|
| 272,654 A | * 2/1883 | Cogswell ..................... 62/91.5 |
| 547,995 A | * 10/1895 | Iliowizi ....................... 62/91.5 |
| 600,943 A | * 2/1898 | Bosmann ..................... 62/95.1 |
| 1,191,017 A | * 7/1916 | Marshall ..................... 62/91.5 |
| 2,298,896 A | * 10/1942 | Meyer ......................... 62/91.5 |
| 2,342,211 A | 2/1944 | Newton |
| 3,910,059 A | * 10/1975 | MacCracken ................. 62/99 |
| 4,011,736 A | 3/1977 | Harrison |
| 4,129,014 A | * 12/1978 | Chubb .......................... 62/333 |
| 4,215,551 A | * 8/1980 | Jones ........................... 60/643 |
| 4,240,268 A | * 12/1980 | Yuan ............................ 62/260 |
| 4,346,569 A | 8/1982 | Yuan |
| 4,409,798 A | 10/1983 | Yuan |
| 4,466,256 A | * 8/1984 | MacCracken ................. 62/260 |
| 4,577,679 A | * 3/1986 | Hibshman ..................... 165/45 |
| 5,246,061 A | * 9/1993 | Zalite ........................... 165/10 |
| 5,762,129 A | * 6/1998 | Elliott ........................ 165/48.1 |
| 6,086,609 A | * 7/2000 | Buckley ...................... 607/104 |

* cited by examiner

*Primary Examiner*—William C. Doerrler
*Assistant Examiner*—Mark Shulman
(74) *Attorney, Agent, or Firm*—McKee, Voorhees & Sease, P.L.C.

(57) ABSTRACT

A natural and environmentally friendly cooling system is disclosed. The cooling system comprises an insulating enclosure, a block of ice within the insulating enclosure, a primary coil of tubing contacting the block of ice and beneath the block of ice for transferring fluid, a return coil of tubing beneath the block of ice for transferring fluid, and a grid positioned between the primary coil and the return coil.

29 Claims, 5 Drawing Sheets

AIR CONDITIONING SYSTEM

BACKGROUND OF THE INVENTION

The present invention relates to an improved air conditioning system. More particularly, although without limitation, the present invention relates to a natural air conditioning system does not necessarily rely on fossil fuels and is not otherwise harmful to the environment.

Air conditioning systems have been used for some time. One of the most common problems with conventional air conditioning systems is that they require the use of refrigerants. For example, air conditioning systems have used FREON as a refrigerant. FREON has been widely publicized as an ozone depleting substance. Ozone depletion is recognized as a cause of increased ultraviolet radiation. Increased ultraviolet radiation is linked to a number of environmental and health problems. Therefore, the use of air conditioning systems using FREON is problematic.

In fact, under the Montreal Protocol of 1987, bans and/or limitations on FREON use have been made throughout the world. Further, servicing of cooling systems using these types of refrigerants may legally require certified technicians. Thus, despite FREON and other chlorofluorocarbon (CFC) refrigerants being banned or limited in use, problems remain. In particular, those refrigerants that have replaced FREON are not necessarily environmentally friendly. In fact, some believe that the refrigerants that have replaced FREON are actually more harmful to the environment and to human health than FREON.

Another prior art approach has been to use natural gas air conditioning systems. These systems have been touted as being environment friendly. These systems do not use harmful refrigerants, but instead use water as a refrigerant. The main byproducts of these systems are carbon dioxide and water vapor, thus making the operation of these types of air conditioning systems environmentally clean. Unfortunately, however, problems remain. In particular, the very use of natural gas is problematic. It is well known problem that the world is quickly depleting its limited supply of fossil fuels, including natural gas. The use of natural gas air conditioning systems contribute to this problem. Thus, many problems remain with using conventional refrigerants and conventional techniques.

Therefore, it is a primary object, feature, or advantage of the present invention to improve upon the state of the art.

It is a further object, feature, or advantage of the present invention to provide an air conditioning system that is environmentally safe.

It is a further object, feature, or advantage of the present invention to provide an air conditioning system that does not negatively affect human health.

A still further object, feature, or advantage of the present invention is to provide an air conditioning system that does not require use of FREON or other CFC refrigerants.

Yet another object, feature, or advantage of the present invention is to provide an air conditioning system that does not deplete the ozone layer.

It is a further object, feature, or advantage of the present invention to provide an air conditioning system that does not require certified technicians to operate or repair.

Another object, feature, or advantage of the present invention is to provide an air conditioning system that does not require the use of natural gas or other fossil fuels.

Yet another object, feature, or advantage of the present invention is to provide an air conditioning system that can be located above ground.

A further object, feature, or advantage of the present invention is to provide an air conditioning system that uses movable blocks of ice.

These and other objects, features, or advantages of the present invention will become apparent from the Specification and Claims that follow.

BRIEF SUMMARY OF THE INVENTION

The present invention includes an improved air conditioning system. A block of ice is placed within an insulating enclosure. There is a primary coil of pipe or other tubing contacting the block of ice and located beneath the block of ice. The primary coil or tubing transfers fluid to a radiator. There is also a return coil of tubing beneath the block of ice for transferring fluid returning from the radiator. The coils can be any number of materials, including copper. Within the coils is a fluid. The fluid can contain water and antifreeze. A grid is positioned between the primary coil and the return coil. The cooling system includes a floor pan for collecting water beneath the grid. In addition, a drain can be connected to a bottom interior surface of the enclosure. As the block of ice cools the primary coil, it very slowly melts so that ice water accumulates at the bottom of the enclosure. The return coil tubing passes through this ice water so that fluid within the return coil is already cooled when it enters the primary coil. Further, an overflow outlet can be used for draining water overflow from the enclosure.

Another aspect of the present invention includes a method of air conditioning. According to the method, an enclosure is filled with water to be frozen. The water is then frozen to form a block of ice within the enclosure. Alternatively, the ice can formed at a remote location and then transported to the enclosure or otherwise provided. Fluid is then circulated through a coil beneath the block of ice to cool the fluid. The fluid is circulated to a radiator. The fluid is then returned from the radiator through a second coil cooled by water melted from the ice. Thus, in this manner, fluid to the radiator is cooled. A fan is placed proximate the radiator to circulate air that is cooled.

Thus, the present invention provides for numerous advantages. In particular, the present invention does not require use of any fossil fuels or any harmful refrigerants; therefore, the present invention is natural, safe and environmentally friendly.

DETAILED DESCRIPTION OF THE INVENTION

Figure 1:
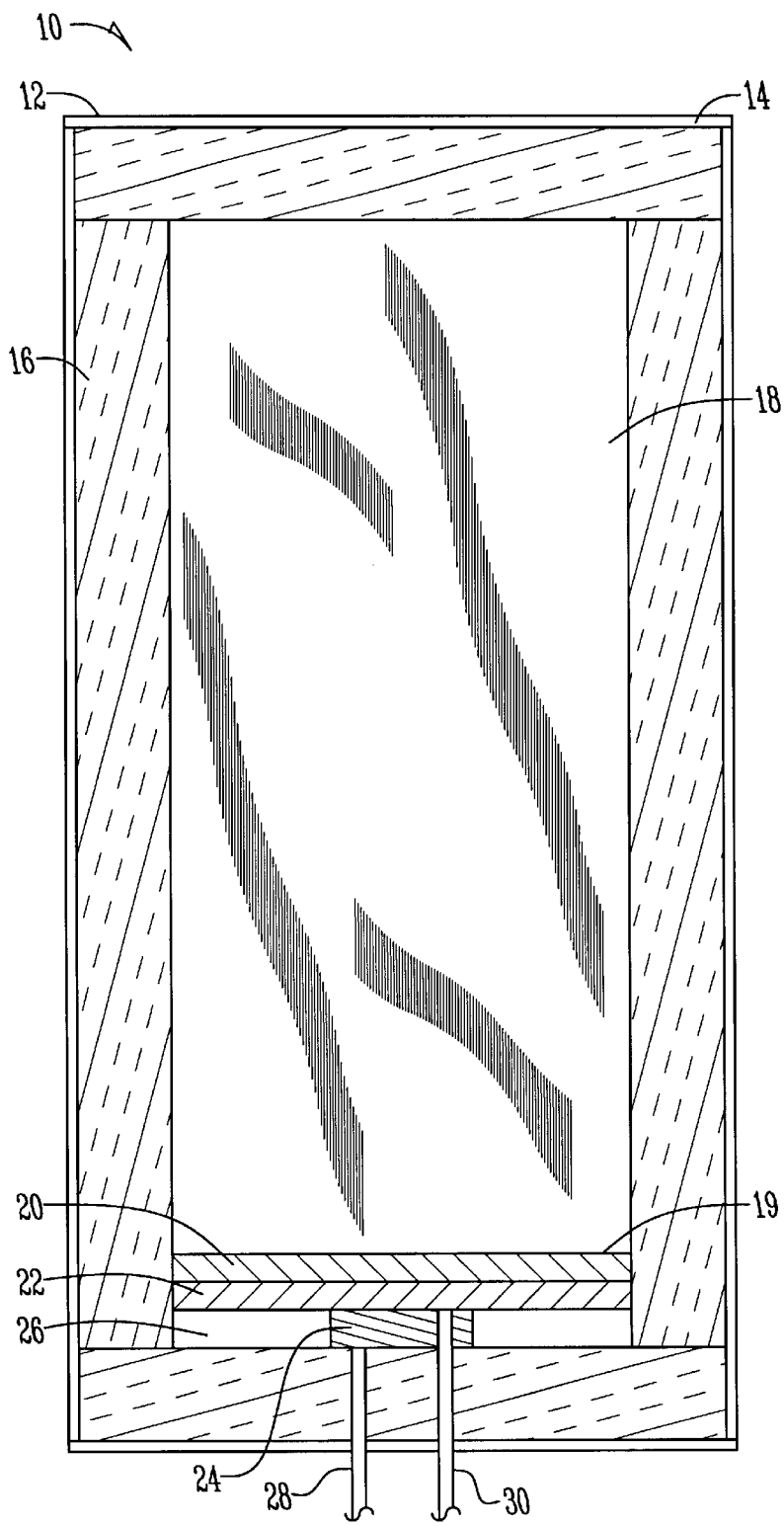
FIG. 1 provides a sectional view of one embodiment of the cooling system according to the present invention.

FIG. 1 provides a sectional view of a cooling system 10 according to the present invention. The cooling system 10 provides an insulating enclosure 12. The insulating enclosure 12 preferably includes an outer layer of wood, such as plywood 14, and an inner layer of styrofoam 16 or other insulative material. Within the insulating enclosure 12 is a block of ice 18. The block of ice 18 has a bottom surface 19.

The block of ice 18 is placed over a primary coil 20. Fluid, such as, but not limited to, water and antifreeze, flows through the primary coil 20. The block of ice 18 cools the fluid within the primary coil 20. The primary coil 20 sits on a grid 22 that provides support. Beneath the primary coil 20 and the grid 22 is a return coil 24. The fluid also passes through the return coil 24. Beneath the grid 22 is a floor pan 26 for collecting melted water from the block of ice 18. The melted water within the floor plan 26 serves to cool fluid in the return coil 24.

A drain pipe 28 is also shown that allows water to be drained from the enclosure 12. In addition, an overflow outlet 30 is provided. The overflow outlet 30 or other structure is used to reduce the amount of water within the floor pan 26 and/or the enclosure 12. Preferably, the outlet 30 is set so that the level of water in the bottom of the enclosure 12 does not rise above the primary coil 20. This maintains the position of the block of ice 18 on top of the primary coil 20 and the accompanying cooling effect on the fluid within the primary coil 20.

Figure 2:
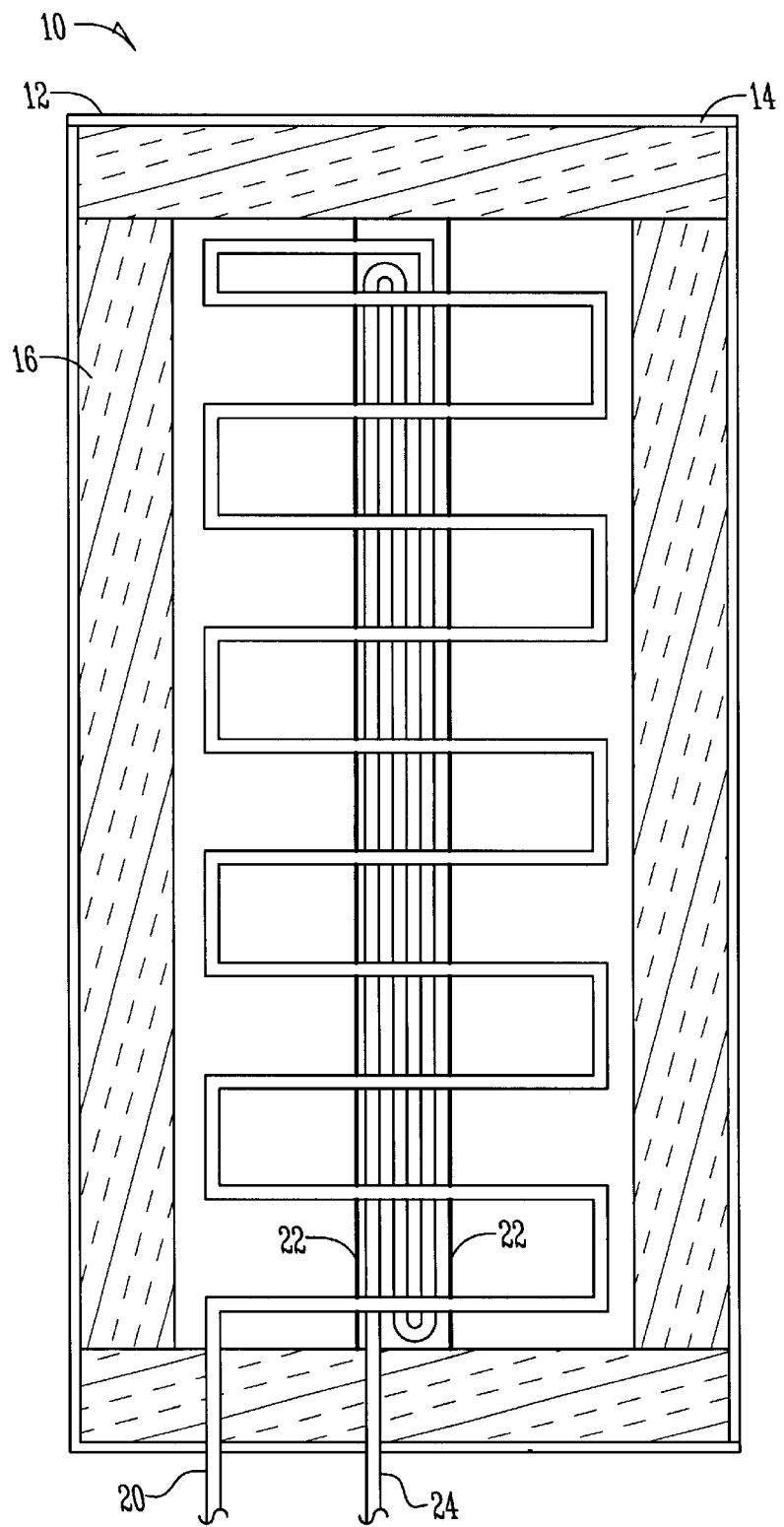
FIG. 2 provides a top view of one embodiment of the cooling system according to the present invention.

FIG. 2 provides a top view looking into the cooling system 10. As shown in FIG. 2, the primary coil 20 winds around so that there is an increased amount of surface contact between the primary coil 20 and the block of ice 18. The grid 22 is a support structure that is located below the primary coil 20. Below the grid 22 is the return coil 24. The return coil 24 contains the fluid after it returns from a radiator.

Figure 3:
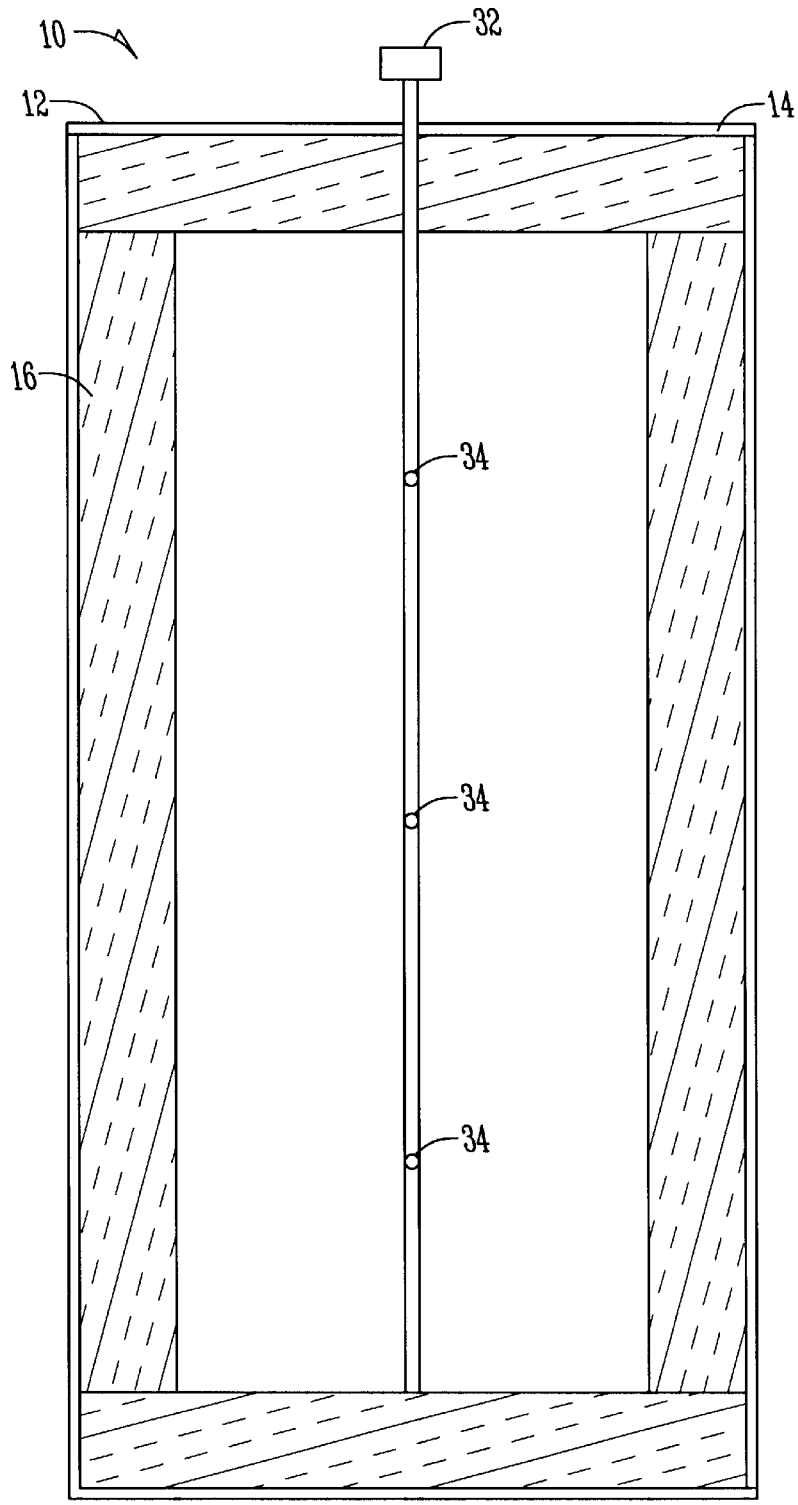
FIG. 3 provides a top view of the enclosure of the present invention being filled.

FIG. 3 shows a top view of the enclosure 12 as the enclosure is being filled with water. A hose is connected to connector 32 to provide water. Sprayers or water application jets 34 are shown that are used to fill the enclosure 12 with water. This configuration is preferred because it allows the enclosure 12 to be filled to an even level. Using jets 34 allow water to be slowly introduced into the enclosure 12 so that the water will freeze to ice as it is applied. The present invention contemplates that the size of the jets can be adjusted according to the ambient temperature. For example, as the temperature gets colder, larger jets are used as water freezes at a faster rate. In addition, the larger flow of water prevents the input line, such as a hose, from freezing. The present invention, however, contemplates that ice can be provided for in other manners as well. For example, ice 18 can be brought to the enclosure from a remote location and placed within the enclosure 12. A service can be provided for delivering ice to enclosures 12 used in homes, businesses, and other installations. The present invention also contemplates that the complete enclosure 12 is transportable. For example, the enclosure 12 is optionally mounted on a chassis so that the enclosure 12 can easily be transported from one location to another, for filling, freezing, or other purposes.

Figure 4:
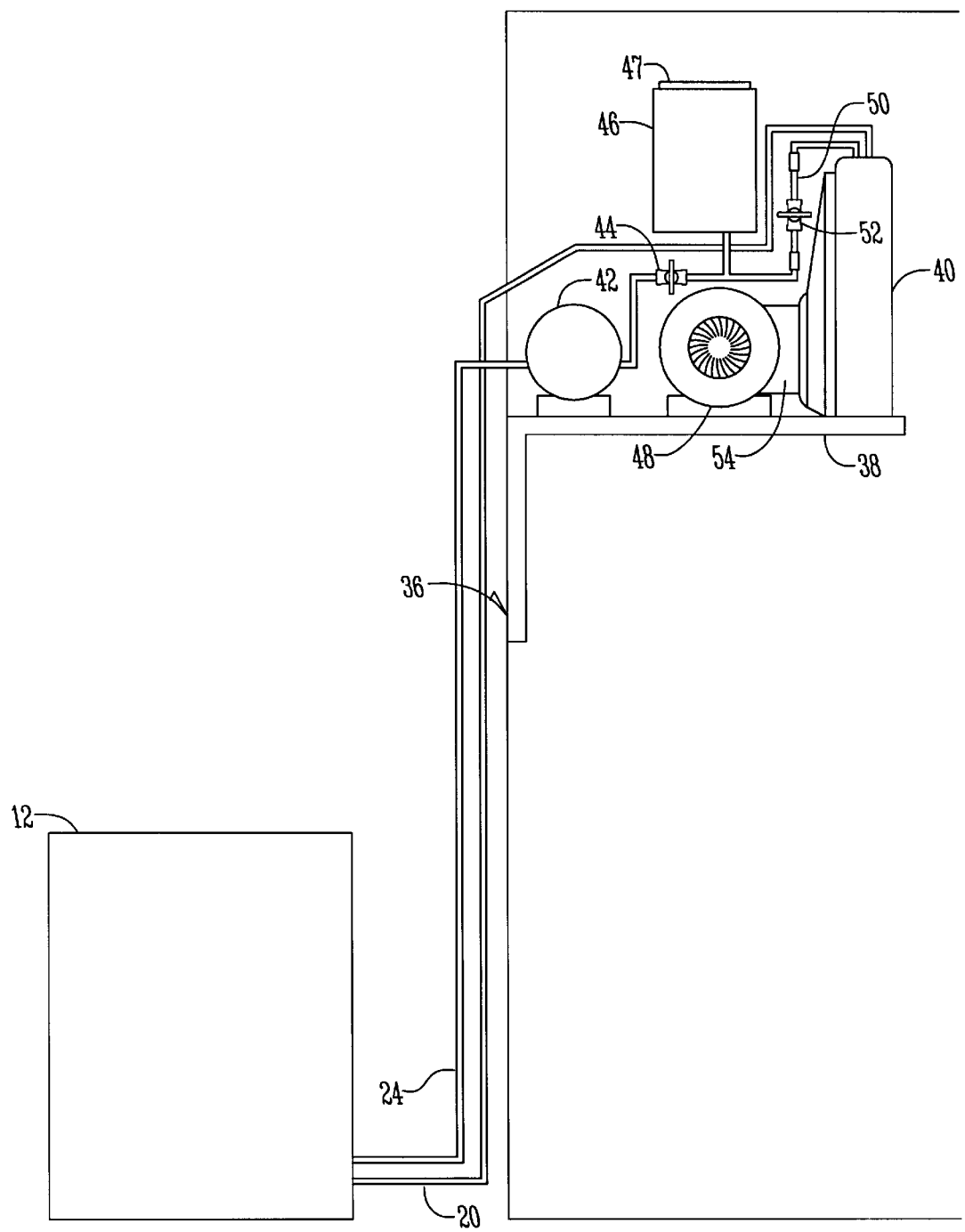
FIG. 4 provides a front view of the cooling system according to one embodiment of the present invention, the cooling system being installed to provide air conditioning to the building.

FIG. 4 provides a diagram of the enclosure 12 as it is connected in one embodiment of an air conditioning system. The primary and return coils (20, 24) are shown providing connections to a radiator 40 placed on a platform 38 within a building (not numbered). A circulation pump 42 is used to force the fluid through the system. The expansion chamber 46 contains fluid to be circulated. The expansion chamber 46 allows coolant within the system to contract and expand as needed. A fill door 47 is provided for filling the expansion chamber 46 with fluid. Preferably the fluid contains water and antifreeze, although other refrigerants can be used. A portion of pipe or tubing 50 is preferably clear so that the level of fluid within the system can be easily monitored at any time so that additional fluid can be added when necessary. A bleed valve 44 is also provided so that air can bleed from the system if necessary. A fan 48 is placed in a position proximate to the radiator 40 in order to circulate air across the radiator 40 to produce cold air. The fan 48 can be a 2-speed squirrel cage fan for efficiency and noise control, although the present invention contemplates that other types of fans may be used. A shroud 54 is preferably connected between the fan 48 and the radiator 40 to increase the amount of forced air going through the radiator 40 and into the building to be cooled. A shut off valve 52 is also shown to shut off the flow of fluid. Thus, in this manner, an air cooling system is provided. The fan 48 and circulation pump 42 are preferably run from an electric motor. Thus, in this embodiment of the present invention, no fossil fuels are required in order to operate the air conditioning system. Although in the embodiment shown a fan and a radiator are shown, the present invention contemplates other variations of evaporators can be used according to the present invention.

As shown in FIG. 4, the enclosure 12 is outside of the building, above ground and readily accessible. Thus, the enclosure 12 can be moved from location to location. To do so, the present invention contemplates placing the enclosure 12 on a chassis or otherwise transporting the enclosure. In addition, ice can be produced in one location and then transported to the air conditioning system according to the present invention. For example, the enclosure 12 can be opened and a new block of ice can be placed therein.

Figure 5:
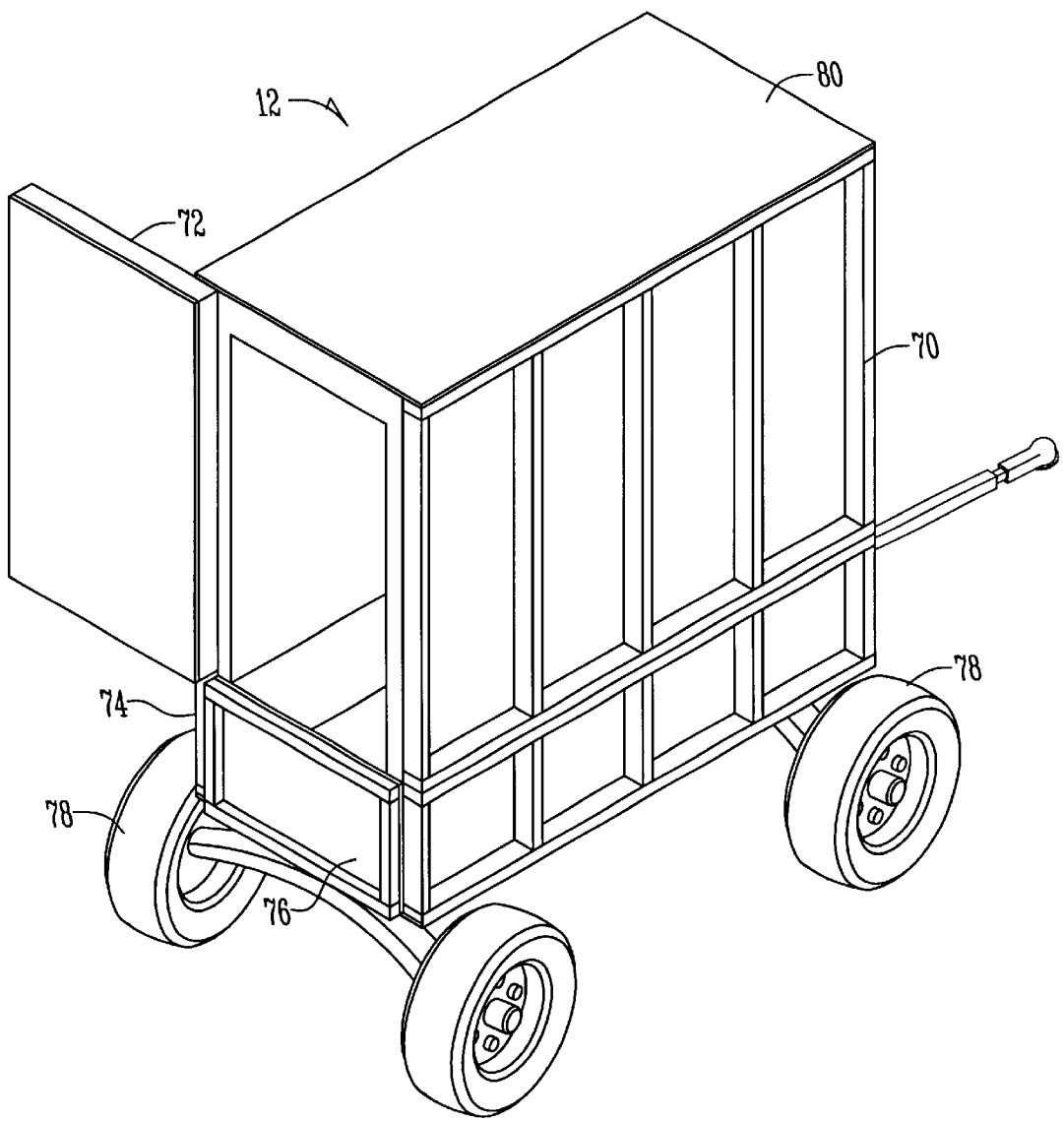
FIG. 5 provides a perspective view of one embodiment of the present invention.

FIG. 5 provides a perspective view of one embodiment of the present invention. In FIG. 5, the enclosure 12 is shown with an access door 72. The access door 72 allows blocks of ice to be inserted into the enclosure 12 and onto the primary coils. Although the access door 72 is shown in the rear of the enclosure 12, the present invention contemplates that an access door or panel can be provided elsewhere, including on the top 80 or sides of the enclosure 12.

As shown in FIG. 5, the present invention further provides that there is a base portion 74 and an ice chamber portion 70. The base portion 74 contains the coils. The coils and pan can be accessed through a door or panel 76. In addition, the base portion 74 is preferably transportable and includes wheels 78. The present invention contemplates that whole ice chambers 70, containing ice, can be provided by a service industry. Thus, ice does not need to be removed from the ice chamber 70, prolonging the life of the ice.

The present invention contemplates numerous other variations. These include the sizes and proportions of the various structures within the present invention, the types of materials used, the relative placement of components, and other variations within the broad spirit and scope of the invention.

What is claimed is:

1. A cooling system, comprising:
    an above ground insulating enclosure;
    a block of ice within the insulating enclosure;
    a primary coil of tubing contacting the block of ice and beneath the block of ice for transferring fluid;
    a return coil of tubing beneath the block of ice for transferring fluid; and
    a grid positioned between the primary coil and the return coil.

2. The cooling system of claim 1 further comprising a floor pan for collecting water beneath the grid.

3. The cooling system of claim 1 further comprising a drain connected to a bottom interior surface of the insulating enclosure.

4. The cooling system of claim 1 further comprising an overflow outlet within said insulating enclosure for draining water overflow.

5. The cooling system of claim 1 wherein the fluid includes water and antifreeze.

6. The cooling system of claim 1 further comprising a radiator, the primary coil fluidly connected to an input of the radiator and the return coil fluidly connected to an output of the radiator.

7. The cooling system of claim 6 further comprising a fan proximate the radiator for circulating air across the radiator to cool the air.

8. The cooling system of claim 1 wherein the insulating enclosure includes a layer of styrofoam and a layer of plywood, the layer of styrofoam between the layer of plywood and the block of ice.

9. The cooling system of claim 1 wherein the return coil is cooled by water melted from the block of ice.

10. The cooling system of claim 1 wherein the insulating enclosure is portable.

11. A method of air conditioning comprising:

filling an above ground enclosure with water to be frozen;

freezing the water to form ice within the enclosure;

circulating fluid through a first coil adjacent the ice to cool the fluid;

circulating the fluid to a radiator;

cooling a building with the radiator; and returning the fluid from the radiator through a second coil cooled by water melted from the ice.

12. The method of claim 11 further comprising transporting the ice from a first location to a second location.

13. The method of claim 11 wherein the fluid includes water and antifreeze.

14. A cooling system, comprising:

an enclosure having an above ground insulating layer and adapted for receiving a block of ice;

a primary coil within the enclosure such that the block of ice rests on the primary coil to cool a fluid flowing through the primary coil;

a grid beneath the primary coil separating the primary coil and a return coil;

the return coil positioned along a bottom interior surface of the enclosure such that water from melted ice cools fluid within the return coil.

15. The cooling system of claim 14 further comprising an overflow outlet within said enclosure for draining water overflow.

16. The cooling system of claim 14 wherein the insulating layer includes a layer of styrofoam.

17. The cooling system of claim 14 wherein the fluid is a mixture of water and antifreeze.

18. The cooling system of claim 14 further comprising a radiator, the primary coil fluidly connected to an input of the radiator and the return coil fluidly connected to an output of the radiator.

19. The cooling system of claim 18 further comprising a fan proximate the radiator for circulating air across the radiator to cool the air.

20. A method of air conditioning, comprising:

providing an enclosure having an above ground insulating layer, a primary coil, a drain connected to a bottom interior surface of the enclosure and a return coil beneath the primary coil; and providing a block of ice.

21. The method of claim 20 wherein the step of providing a block of ice includes delivering the block of ice to the enclosure.

22. The method of claim 20 wherein the step of providing a block of ice includes filling the enclosure with water, freezing the water within the enclosure to form block of ice.

23. A cooling system, comprising:

an above ground base portion;

a primary coil disposed within the base portion, the primary coil adapted for contacting a block of ice to cool fluid within the primary coil;

a return coil disposed within the base portion and adapted for transferring fluid.

24. The cooling system of claim 23 further comprising a floor pan disposed within the base portion and adapted for collecting water melted from the block of ice.

25. The cooling system of claim 23 further comprising an ice chamber for containing the block of ice such that the block of ice contacts the primary coil to cool fluid within the primary coil.

26. The cooling system of claim 23 further comprising a plurality of wheels operatively connected to the base portion.

27. A cooling system, comprising:

an insulating enclosure;

a block of ice within the insulating enclosure;

a primary coil of tubing adjacent the block of ice for transferring fluid;

a return coil of tubing adjacent the block of ice for transferring fluid; and a floor pan for collecting water beneath the grid.

28. A cooling system, comprising:

an insulating enclosure;

a block of ice within the insulating enclosure;

a primary coil of tubing adjacent the block of ice for transferring fluid;

a return coil of tubing adjacent the block of ice for transferring fluid; and a drain connected to a bottom interior surface of the insulating enclosure.

29. A cooling system, comprising:

a base portion;

a primary coil disposed within the base portion, the primary coil adapted for contacting a block of ice to cool fluid within the primary coil;

a return coil disposed within the base portion and adapted for transferring fluid; and a floor pan disposed within the base portion and adapted for collecting water melted from the block of ice.

* * * * *